US012560957B2

(12) United States Patent
Uchimoto

(10) Patent No.: US 12,560,957 B2
(45) Date of Patent: Feb. 24, 2026

(54) LINEAR REGULATOR

(71) Applicant: ROHM CO., LTD., Kyoto (JP)

(72) Inventor: Daisuke Uchimoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 190 days.

(21) Appl. No.: 18/498,660

(22) Filed: Oct. 31, 2023

(65) Prior Publication Data

US 2024/0152168 A1 May 9, 2024

(30) Foreign Application Priority Data

Nov. 9, 2022 (JP) ................................ 2022-179450

(51) Int. Cl.
*G05F 1/575* (2006.01)
*G05F 1/573* (2006.01)

(52) U.S. Cl.
CPC .............. *G05F 1/575* (2013.01); *G05F 1/573* (2013.01)

(58) Field of Classification Search
CPC ........... G05F 1/571; G05F 1/573; G05F 1/575
See application file for complete search history.

(56) References Cited

U.S. PATENT DOCUMENTS

2011/0121802 A1* 5/2011 Zhu ......................... G05F 1/575 323/281
2019/0302820 A1* 10/2019 Yasusaka ................ G05F 1/575

FOREIGN PATENT DOCUMENTS

WO WO 2021/054027 3/2021

* cited by examiner

*Primary Examiner* — Jue Zhang
(74) *Attorney, Agent, or Firm* — Fish & Richardson P.C.

(57) ABSTRACT

A linear regulator includes an input terminal configured to receive an input voltage, an output terminal configured to be applied with an output voltage, an output transistor connected between the input terminal and the output terminal, and constituted by a P-channel MOSFET, a gate control circuit configured to control a gate voltage of the output transistor to stabilize the output voltage at a target voltage based on a feedback voltage corresponding to the output voltage, and an additional circuit, wherein a control range of the gate voltage controlled by the gate control circuit is equal to or higher than a predetermined lower limit voltage, and wherein the additional circuit is configured to lower the gate voltage to below the lower limit voltage when the output voltage falls below a determination voltage lower than the target voltage.

5 Claims, 7 Drawing Sheets

LINEAR REGULATOR

CROSS-REFERENCE TO RELATED APPLICATION

This application is based upon and claims the benefit of priority from Japanese Patent Application No. 2022-179450, filed on Nov. 9, 2022, the entire contents of which are incorporated herein by reference.

TECHNICAL FIELD

The present disclosure relates to a linear regulator.

BACKGROUND

A linear regulator, which generates an output voltage from an input voltage, is provided with an output transistor between an input terminal, which receives the input voltage, and an output terminal, which applies the output voltage, and performs feedback control to control a gate voltage of the output transistor based on a feedback voltage corresponding to the output voltage. It is possible to stabilize the output voltage at a desired target voltage by the feedback control.

BRIEF DESCRIPTION OF DRAWINGS

The accompanying drawings, which are incorporated in and constitute a part of the specification, illustrate embodiments of the present disclosure.

DETAILED DESCRIPTION

Figure 1:
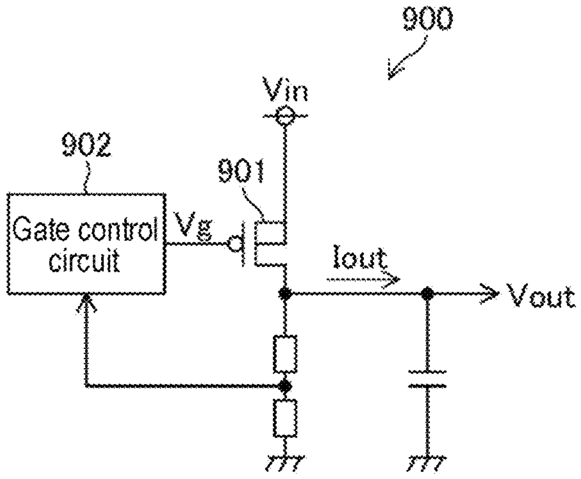
FIG. 1 is a configuration diagram of a semiconductor device (linear regulator) according to a reference configuration.

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Examples of embodiments of the present disclosure will be specifically described below with reference to the drawings. In each referenced figure, the same parts are designated by like reference numerals, and the overlapping explanation regarding the same parts will be omitted in principle. In this specification, for the purpose of simplifying the description, by indicating symbols or reference numerals that refer to information, signals, physical quantities, functional parts, circuits, elements, components, and the like, the names of information, signals, physical quantities, functional parts, circuits, elements, components, and the like corresponding to the symbols or reference numerals may be omitted or abbreviated.

First, some terms used in the description of the embodiments of the present disclosure will be explained. The term "ground" refers to a reference conductive portion having a reference potential of 0 V (zero volts), or refers to the potential of 0 V itself. The reference conductive portion may be formed using a conductor such as metal or the like. The potential of 0 V is sometimes referred to as a ground potential. In the embodiments of the present disclosure, voltages shown without any particular reference represent potentials as seen from the ground. The term "level" refers to the level of a potential. For any signal or voltage of interest, a high level has a higher potential than a low level.

Regarding any transistor configured as a FET (field effect transistor) including a MOSFET, the term "on-state" refers to a state in which the drain and source of the transistor are electrically connected to each other, and the term "off-state" refers to a state in which the drain and source of the transistor are not electrically connected to each other (cutoff state). The same applies to transistors that are not classified as FETs. The MOSFET is regarded as an enhancement type MOSFET unless otherwise specified. MOSFET is an abbreviation for "metal-oxide-semiconductor field-effect transistor." Further, unless otherwise specified, the back gate of any MOSFET may be considered to be short-circuited to the source.

Hereinafter, the on-state and off-state of any transistor may be simply expressed as on and off. Connections between multiple parts that form a circuit, such as arbitrary circuit elements, wirings, nodes, and the like, may be regarded as electrical connections, unless otherwise specified.

For any two voltages V1 and V2 to be compared, "V1>V2" represents that the voltage V1 is higher than the voltage V2, and "V1<V2" represents that the voltage V1 is lower than the voltage V2. The same applies to other formulae that include physical quantities other than a voltage.

Reference Configuration

FIG. 1 shows a configuration of a semiconductor device 900 according to a reference configuration. The semiconductor device 900 is a linear regulator which generates an output voltage Vout from an input voltage Vin. The semiconductor device 900 includes a transistor 901 which is a P-channel MOSFET. The input voltage Vin is supplied to a source of the transistor 901, and an output voltage Vout is applied to a drain of the transistor 901. In the semiconductor device 900, a gate control circuit 902 stabilizes the output voltage Vout at a predetermined target voltage Vtg by controlling a gate voltage Vg of the transistor 901 based on a feedback voltage corresponding to the output voltage Vout. A drain current of the transistor 901 corresponds to an output current Iout of the semiconductor device 900 (linear regulator).

The input voltage Vin may vary depending on a system in which the semiconductor device 900 is installed. In order to stabilize the output voltage Vout at the target voltage Vtg against the variation in the input voltage Vin, it is necessary to control the gate voltage Vg according to the variation in the input voltage Vin. However, if the gate voltage Vg is lowered excessively in response to a decrease in the input voltage Vin, it will take a long time for the gate control circuit 902 to raise the gate voltage Vg by a necessary amount when the input voltage Vin returns. That is, a responsiveness of the output voltage Vout to the variation in the input voltage Vin becomes low.

Taking this into consideration, the gate control circuit 902 controls the gate voltage Vg so as to become equal to or higher than a lower limit voltage (e.g., 2 V) which is higher than 0 V. In other words, the gate control circuit 902 does not lower the gate voltage Vg below the lower limit voltage. This makes it possible to improve the responsiveness of the output voltage Vout to the variation in the input voltage Vin.

Figure 2:
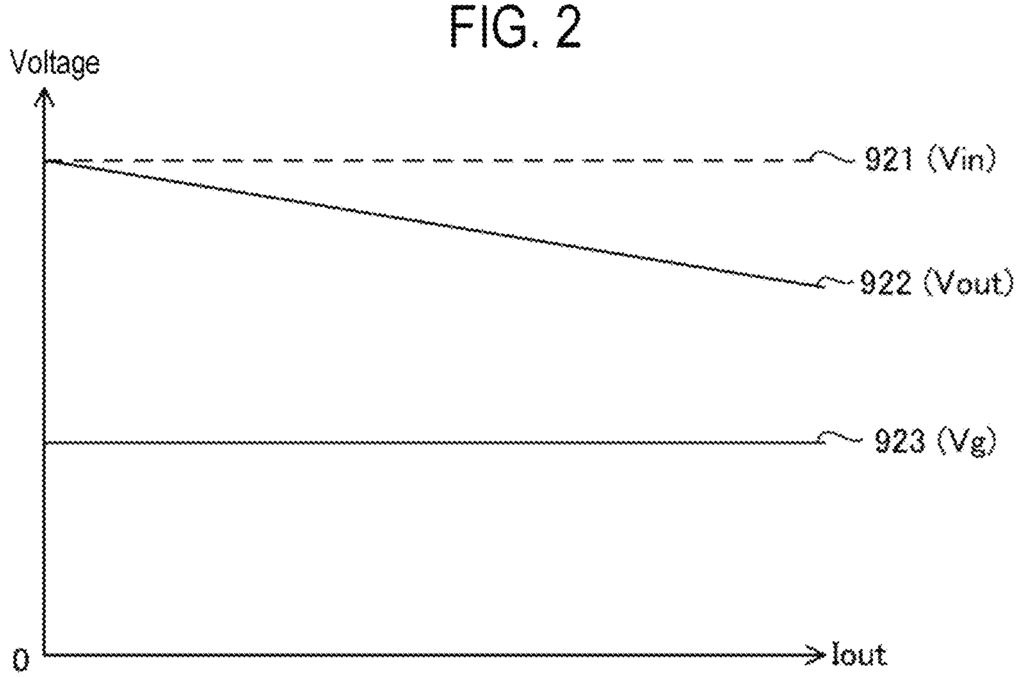
FIG. 2 is an explanatory diagram of output characteristics of a semiconductor device according to a reference configuration.

However, in a configuration such as the reference configuration in which the decrease in the gate voltage Vg is limited, when the input voltage Vin decreases to the target voltage Vtg or less, the output voltage Vout becomes significantly lower than the target voltage Vtg depending on the output current Iout. FIG. 2 shows output characteristics of the semiconductor device 900. In FIG. 2, it is assumed that the target voltage Vtg is 5.0 V, whereas the input voltage Vin is fixed at 4.95 V. In FIG. 2, a horizontal axis corresponds to the output current Iout. In FIG. 2, a broken line 921 represents a relationship between the input voltage Vin and the output current Iout, a solid line 922 represents a relationship between the output voltage Vout and the output current Iout, and a solid line 923 represents a relationship between the gate voltage Vg and the output current Iout.

Under the condition of "Vin≤Vtg," even if the output current Tout increases, the gate voltage Vg will not fall below the lower limit voltage (e.g., 2.0 V). Therefore, the output voltage Vout will decrease as the output current Tout increases. However, it is desirable that a differential voltage (Vin−Vout) or (Vin−Vtg) when "Vin≤Vtg" is as small as possible.

First Embodiment

Figure 3:
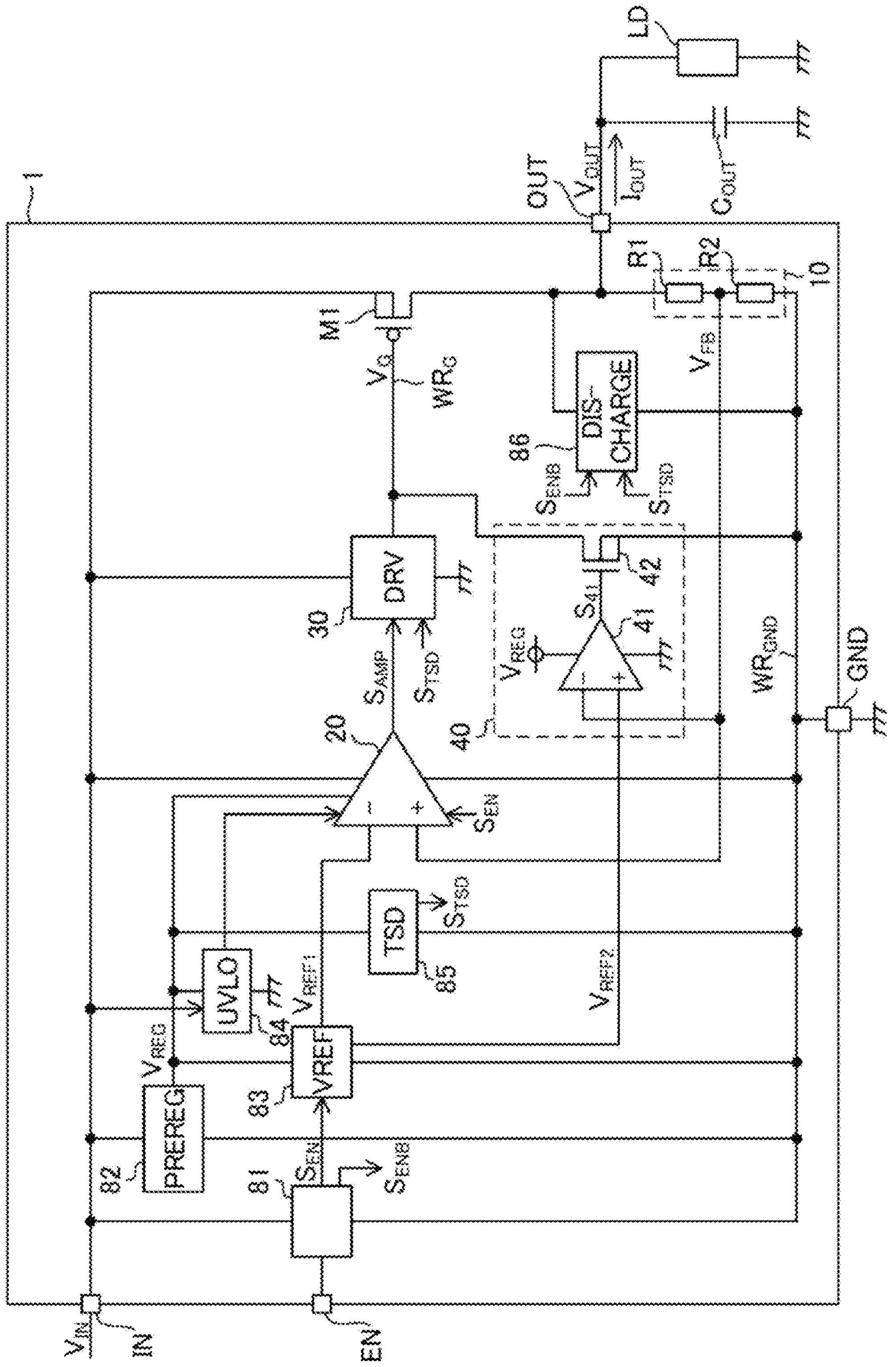
FIG. 3 is a configuration diagram of a semiconductor device (linear regulator) according to a first embodiment of the present disclosure.

A first embodiment of the present disclosure will be described. FIG. 3 shows a configuration of a semiconductor device 1 according to the first embodiment. The semiconductor device 1 is a linear regulator which generates an output voltage $V_{OUT}$ from an input voltage $V_{IN}$, and therefore, the semiconductor device 1 may also be regarded as the linear regulator 1. The linear regulator as the semiconductor device 1 may be an LDO (Low Dropout) type linear regulator.

The input voltage $V_{IN}$ and the output voltage $V_{OUT}$ are positive DC voltages. The semiconductor device 1 performs feedback control to stabilize the output voltage $V_{OUT}$ at a predetermined target voltage $V_{TG}$. However, the stabilization of the output voltage $V_{OUT}$ at the target voltage $V_{TG}$ is achieved under the condition that establishes "$V_{IN}>V_{TG}$." Basically, the input voltage $V_{IN}$ is higher than the output voltage $V_{OUT}$ and the target voltage $V_{TG}$. However, due to a decrease in an output of a voltage source which supplies the input voltage $V_{IN}$ to the semiconductor device 1, and the like, the input voltage $V_{IN}$ may sometimes be lower than or equal to the output voltage $V_{OUT}$ and the target voltage $V_{TG}$. The voltage source, which supplies the input voltage $V_{IN}$ to the semiconductor device 1, may be, for example, a battery mounted on a vehicle such as an automobile or the like. An output voltage of the battery mounted on the vehicle may drop significantly, albeit temporarily.

Figure 4:
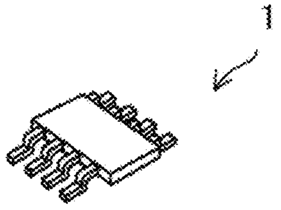
FIG. 4 is an external perspective view of the semiconductor device according to the first embodiment of the present disclosure.

FIG. 4 is an external perspective view of the semiconductor device 1. The semiconductor device 1 is an electronic component which includes a semiconductor chip having a semiconductor integrated circuit formed on a semiconductor substrate, a casing (package) configured to accommodate the semiconductor chip, and a plurality of external terminals exposed to an outside of the semiconductor device 1 from the casing. The semiconductor device 1 is formed by enclosing the semiconductor chip in the casing (package) made of a resin. The number of external terminals of the semiconductor device 1 and the type of casing of the semiconductor device 1 shown in FIG. 4 are merely examples, and may be designed arbitrarily. FIG. 3 shows an input terminal IN, an output terminal OUT, an enable terminal EN, and a ground terminal GND included in the plurality of external terminals. External terminals other than these terminals may also be provided in the semiconductor device 1.

The input voltage $V_{IN}$ from the voltage source is received by the input terminal IN. The voltage applied to the output terminal OUT is the output voltage $V_{OUT}$. The ground terminal GND is connected to the ground and has a ground potential. The ground terminal GND is connected to a ground wiring $WR_{GND}$ provided in the semiconductor device 1. Therefore, the ground wiring $WR_{GND}$ has a ground potential. Each circuit and each element in the semiconductor device 1, which are connected to the ground, specifically means that they are connected to the ground wiring $WR_{GND}$.

An output capacitor $C_{OUT}$ and a load LD are provided outside the semiconductor device 1. A first end of the output capacitor $C_{OUT}$ is connected to the output terminal OUT, and a second end of the output capacitor $C_{OUT}$ is connected to the ground. The load LD is any load which is driven based on the output voltage $V_{OUT}$, and is provided between the output terminal OUT and the ground. A current, which flows from the output terminal OUT toward the output capacitor $C_{OUT}$ and the load LD, is referred to as an output current $I_{OUT}$.

The semiconductor device 1 is provided with an output transistor M1, a feedback circuit 10, a main amplifier 20, and a driver 30 as main components. A full-on circuit 40 provided as an example of an additional circuit in the semiconductor device 1 will be described later. The output transistor M1 is a P-channel MOSFET. A source of the output transistor M1 is connected to the input terminal IN to receive the input voltage $V_{IN}$. A drain of the output transistor M1 is connected to the output terminal OUT. A drain current of the output transistor M1 is a current, which flows from the input terminal IN to the output terminal OUT through the channel of the output transistor M1, and corresponds to the above-mentioned output current $I_{OUT}$.

The feedback circuit 10 is connected to the output terminal OUT. The feedback circuit 10 may be any circuit as long as it generates a feedback voltage $V_{FB}$ according to the output voltage $V_{OUT}$. However, it is assumed that the feedback voltage $V_{FB}$ has a voltage value proportional to the output voltage $V_{OUT}$. The output voltage $V_{OUT}$ itself may be the feedback voltage $V_{FB}$. In the configuration of FIG. 3, the feedback circuit 10 includes voltage dividing resistors R1 and R2. A first end of the voltage dividing resistor R1 is connected to the output terminal OUT, a second end of the voltage dividing resistor R1 is connected to a first end of the voltage dividing resistor R2, and a second end of the voltage dividing resistor R2 is connected to the ground. The feedback voltage $V_{FB}$, which is determined by the output voltage $V_{OUT}$ and a resistance value ratio between the voltage dividing resistors R1 and R2, is generated at a connection node between the voltage dividing resistors R1 and R2 (therefore, the second end of the voltage dividing resistor R1).

The feedback circuit 10 may be provided outside the semiconductor device 1. In this case, a feedback terminal may be provided as an external terminal of the semiconductor device 1, and the connection node between the voltage dividing resistors R1 and R2 may be connected to the feedback terminal. As a result, the feedback voltage $V_{FB}$ is applied to the feedback terminal, so that it is possible to supply the feedback voltage $V_{FB}$ to the circuit that should receive the feedback voltage $V_{FB}$.

The main amplifier 20 is connected to the ground wiring $WR_{GND}$, and is driven based on an internal power supply voltage $V_{REG}$, which will be described later, with the ground potential as a reference. The main amplifier 20 includes an inverting input terminal, a non-inverting input terminal, and an output terminal. In the main amplifier 20, a predetermined reference voltage $V_{REF1}$ is inputted to the inverting input terminal, and the feedback voltage $V_{FB}$ is inputted to the non-inverting input terminal.

The main amplifier 20 outputs a signal $S_{AMP}$ based on the reference voltage $V_{REF1}$ and the feedback voltage $V_{FB}$ from its own output terminal when a signal $S_{EN}$, which will be described later, has a value of "1" and a low voltage abnormality is not detected. In the following description, unless otherwise specified, it is assumed that the signal $S_{EN}$ has a value of "1" and that the low voltage abnormality is not detected. The main amplifier 20 increases the potential of the signal $S_{AMP}$ which establishes "$V_{REF1}<V_{FB}$," and lowers the potential of the signal $S_{AMP}$ which "$V_{REF1}>V_{FB}$." The signal $S_{AMP}$ is supplied to the driver 30.

The driver 30 is driven based on the input voltage $V_{IN}$ with the ground potential as a reference. The driver 30 controls the gate voltage of the output transistor M1 based on the signal $S_{AMP}$ when a signal $S_{TSD}$, which will be described later, has a value of "0." In the following, unless otherwise specified, it is assumed that the signal $S_{TSD}$ has a value of "0." The gate voltage of the output transistor M1 is hereinafter indicated by the symbol "$V_G$." A wiring to which the gate of the output transistor M1 is connected is referred to as a gate wiring $WR_G$. A connection to the gate wiring $WR_G$ and a connection to the gate of the output transistor M1 are equivalent to each other.

The driver 30 is connected to the gate wiring $WR_G$. The driver 30 increases the gate voltage $V_G$ by outputting charges (positive charges) toward the gate wiring $WR_G$ in accordance with the signal $S_{AMP}$, or lowers the gate voltage $V_G$ by pulling out charges (positive charges) from the gate wiring $WR_G$ in accordance with the signal $S_{AMP}$. At this time, the driver 30 operates to lower the gate voltage $V_G$ as the potential of the signal $S_{AMP}$ becomes low, and to increase the gate voltage $V_G$ as the potential of the signal $S_{AMP}$ becomes high.

The decrease in the gate voltage $V_G$ has an effect of increasing the output voltage $V_{OUT}$ through an increase in the drain current of the output transistor M1, and the increase in the gate voltage $V_G$ has an effect of decreasing the output voltage $V_{OUT}$ through a decrease in the drain current of the output transistor M1. Therefore, the main amplifier 20 and the driver 30 perform feedback control to stabilize the output voltage $V_{OUT}$ at the target voltage $V_{TG}$. The feedback control is achieved by controlling the gate voltage $V_G$ based on the feedback voltage $V_{FB}$. A gate control circuit (in other words, a feedback control circuit), which performs the feedback control, is composed of the main amplifier 20 and the driver 30. The feedback control is a control for matching the feedback voltage $V_{FB}$ with the reference voltage $V_{REF1}$ (in other words, a control for reducing a difference between the feedback voltage $V_{FB}$ and the reference voltage $V_{REF1}$). The target voltage $V_{TG}$ is determined by the reference voltage $V_{REF1}$ and the resistance value ratio between the voltage dividing resistors R1 and R2.

When the signal $S_{EN}$ has a value of "0" or when a low voltage abnormality is detected, the operation of the main amplifier 20 is stopped and the potential of the signal $S_{AMP}$ increases to the potential of the input voltage $V_{IN}$. At this time, the driver 30 maximizes the gate voltage $V_G$ (up to the input voltage $V_{IN}$), thereby ensuring an off-state of the output transistor M1. Furthermore, when the signal $S_{TSD}$ has a value of "1," the driver 30 maximizes the gate voltage $V_G$ (up to the input voltage $V_{IN}$) regardless of the signal $S_{AMP}$, thereby ensuring the off-state of the output transistor M1.

The semiconductor device 1 further includes an enable state detection circuit 81, an internal power supply circuit 82, a reference voltage generation circuit 83, a low voltage protection circuit 84, an overheating protection circuit 85, and an output discharge circuit 86. All of the circuits 81 to 86 are connected to the ground wiring $WR_{GND}$ and are operated based on the ground potential.

The enable state detection circuit 81 is driven based on the input voltage $V_{IN}$. The enable state detection circuit 81 is connected to an enable terminal EN to generate and output signals $S_{EN}$ and $S_{ENB}$ based on the voltage applied to the enable terminal EN. The signals $S_{EN}$ and $S_{ENB}$ are binary signals each having a value of "0" or "1." When the signal $S_{EN}$ has a value of "1," the signal $S_{ENB}$ has a value of "0," and when the signal $S_{EN}$ has a value of "0," the signal $S_{ENB}$ has a value of "1." A current can flow through the output transistor M1 only when the signal $S_{EN}$ has a value of "1."

The internal power supply circuit 82 generates an internal power supply voltage $V_{REG}$ having a predetermined positive DC voltage value based on the input voltage $V_{IN}$.

When the signal $S_{EN}$ has a value of "1," the reference voltage generation circuit 83 generates the reference voltage $V_{REF1}$ based on the internal power supply voltage $V_{REG}$, and further generates the reference voltage $V_{REF2}$ based on the reference voltage $V_{REF1}$. The reference voltage $V_{REF1}$ is supplied to the main amplifier 20. The reference voltage $V_{REF2}$ is supplied to the full-on circuit 40. Each of the reference voltages $V_{REF1}$ and $V_{REF2}$ has a predetermined positive DC voltage value. However, the reference voltage $V_{REF2}$ is lower than the reference voltage $V_{REF1}$. The reference voltage generation circuit 83 generates a voltage, which is $k_A$ times higher than the reference voltage $V_{REF1}$, as the reference voltage $V_{REF2}$. That is, "$V_{REF2}=V_{REF1}\times k_A$." $k_A$ referred to here is less than 1 and has a positive value close to 1. Here, it is assumed that "$k_A=0.97$." When the signal $S_{EN}$ has a value of "0," the operation of the reference voltage generation circuit 83 is stopped, so that the reference voltages $V_{REF1}$ and $V_{REF2}$ are not generated.

It may be considered that the internal power supply circuit 82 and the reference voltage generation circuit 83 constitute a voltage generation circuit. The voltage generation circuit constituted by the internal power supply circuit 82 and the reference voltage generation circuit 83 generate the reference voltage $V_{REF1}$ by generating an internal power supply voltage $V_{REG}$ based on the input voltage $V_{IN}$, and generate the reference voltage $V_{REF2}$ based on the reference voltage $V_{REF1}$ In the present disclosure, the voltage generation circuit may directly generate the reference voltage $V_{REF1}$ from the input voltage $V_{IN}$.

The low voltage protection circuit 84 is driven based on the internal power supply voltage $V_{REG}$. The low voltage protection circuit 84 detects whether there is a low voltage abnormality in which the input voltage $V_{IN}$ is less than a predetermined low voltage determination voltage. When a low voltage abnormality is detected, the operation of the main amplifier 20 is stopped and the off-state of the output transistor M1 is ensured.

The overheating protection circuit 85 is driven based on the internal power supply voltage $V_{REG}$. The overheating protection circuit 85 monitors a temperature of the semiconductor chip in the semiconductor device 1 and detects whether there is an overheating abnormality in which the temperature of the semiconductor chip exceeds a predetermined protection setting temperature. The overheating protection circuit 85 outputs a signal $S_{TSD}$ having a value of "1" when the temperature of the semiconductor chip is equal to or higher than a protection set temperature, and otherwise outputs a signal $S_{TSD}$ having a value of "0." In the following, it is assumed that no overheating abnormality is detected (that is, the value of the signal $S_{TSD}$ is "0") unless otherwise specified.

The output discharge circuit 86 includes a discharge switching element connected between the output terminal OUT and the ground. The signals $S_{ENB}$ and $S_{TSD}$ are inputted to the output discharge circuit 86. When the signal $S_{ENB}$ or $S_{TSD}$ has a value of "1," the output discharge circuit 86 turns on the discharge switching element to short-circuit the output terminal OUT and the ground, thereby quickly reducing the output voltage $V_{OUT}$ to 0 V or maintain the output voltage $V_{OUT}$ at 0 V. When the signals $S_{ENB}$ and $S_{TSD}$ have a value of "0," the discharge switching element in the output discharge circuit 86 is kept in an off-state, and no current is generated between the output terminal OUT and the ground through the output discharge circuit 86.

Similar to the reference configuration, the driver 30 controls the gate voltage $V_G$ so as to become equal to or higher than a lower limit voltage $V_{LL}$ (e.g., 2 V) which is higher than 0 V. In other words, when the output voltage $V_{OUT}$ is maintained below the target voltage $V_{TG}$ due to "$V_{IN}<V_{TG}$," the driver 30 can reduce the gate voltage $V_G$ to the lower limit voltage $V_{LL}$, but does not perform any operation to lower the gate voltage $V_G$ to below the lower limit voltage $V_{LL}$.

Figure 5:
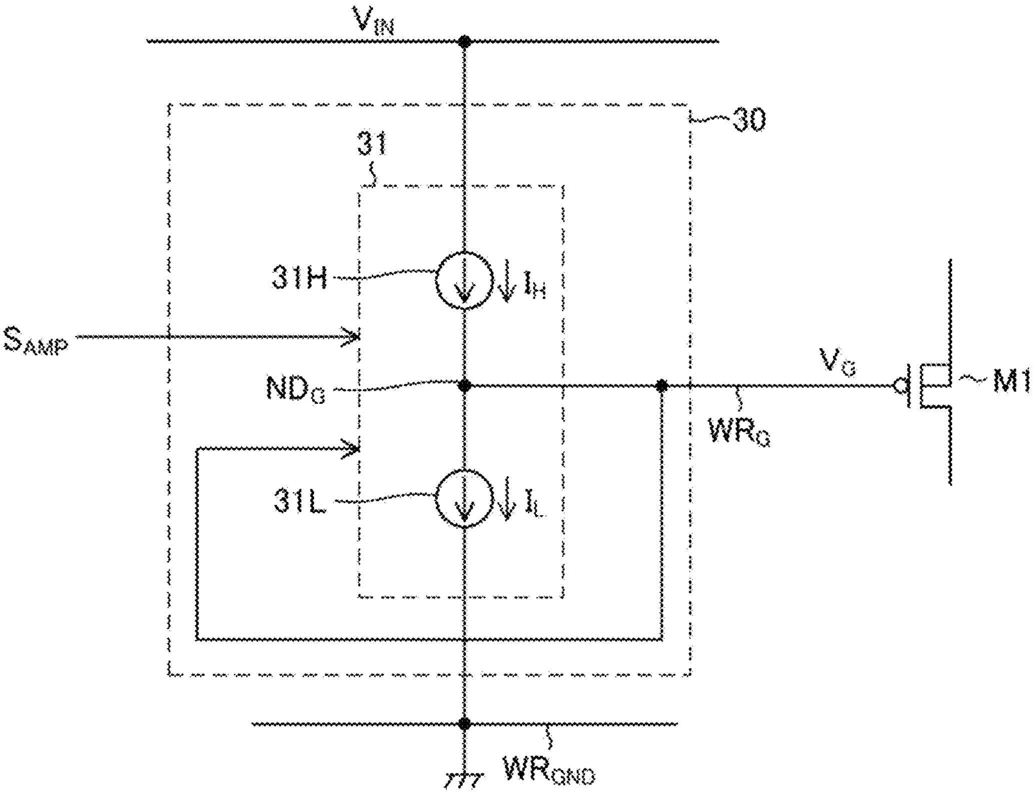
FIG. 5 is a schematic internal configuration diagram of a driver according to the first embodiment of the present disclosure.

FIG. 5 shows a schematic configuration of the driver 30. The driver 30 in FIG. 5 includes a current driver 31. The current driver 31 includes a high-side current supply circuit 31H and a low-side current supply circuit 31L. Each of the current supply circuits 31H and 31L generates a current based on the input voltage $V_{IN}$. The current generated by the current supply circuit 31H is represented by a symbol "IH," and the current generated by the current supply circuit 31L is represented by a symbol "IL." The current supply circuits 31H and 31L are connected in series with each other between the wiring to which the input voltage $V_{IN}$ is applied and the ground wiring $WR_{GND}$. The current supply circuits 31H and 31L are commonly connected to a node $ND_G$. The node $ND_G$ is connected to the gate wiring $WR_G$.

The current supply circuit 31H is provided between the wiring to which the input voltage $V_{IN}$ is applied and the node $ND_G$, and generates a current $I_H$ flowing from the wiring to which the input voltage $V_{IN}$ is applied to the node NDG. The current supply circuit 31L is provided between the node $ND_G$ and the ground wiring $WR_{GND}$, and generates a current $I_L$ flowing from the node $ND_G$ to the ground wiring $WR_{GND}$.

The current driver 31 sets and changes the currents $I_H$ and $I_L$ based on the signal $S_{AMP}$ from the main amplifier 20. A method of setting the currents $I_H$ and $I_L$ will be explained starting from a basic state where "$V_{OUT}=V_{TG}$" and "$I_H=I_L$."

When the potential of the signal $S_{AMP}$ decreases due to a decrease in the output voltage $V_{OUT}$ from the basic state, in response to the decrease in the potential of the signal $S_{AMP}$, the current driver 31 decreases the current $I_H$ and increases the current $I_L$, or increases the current $I_L$ without changing the current $I_H$. As a result, it becomes that "$I_H<I_L$," and the charges corresponding to the differential current ($I_L-I_H$) are drawn from the gate wiring $WR_G$ to the current driver 31, thereby lowering the gate voltage $V_G$. The decrease in the gate voltage $V_G$ increases the drain current of the transistor M1, and the increase in the drain current of the transistor M1 has an effect of increasing the output voltage $V_{OUT}$ (however, the output voltage $V_{OUT}$ does not necessarily increase actually).

On the other hand, when the potential of the signal $S_{AMP}$ increases due to an increase in the output voltage $V_{OUT}$ from the basic state, in response to the increase in the potential of the signal $S_{AMP}$, the current driver 31 decreases the current $I_L$ and increases the current $I_H$, or increases the current $I_H$ without changing the current $I_L$. As a result, it becomes that "$I_H$>IL," and the charges corresponding to the differential current ($I_H-I_L$) are supplied from the current driver 31 to the gate wiring $WR_G$, thereby increasing the gate voltage $V_G$. The increase in the gate voltage $V_G$ decreases the drain current of the transistor M1, and the decrease in the drain current of the transistor M1 has an effect of decreasing the output voltage $V_{OUT}$ (however, the output voltage $V_{OUT}$ does not necessarily decrease actually).

In the current driver 31, magnitudes of the currents $I_H$ and $I_L$ are set depending on not only the signal $S_{AMP}$ but also the gate voltage $V_G$. Specifically, the current driver 31 can increase the gate voltage $V_G$ to the input voltage $V_{IN}$ by continuing an established state that "$I_H>I_L$." When the gate voltage $V_G$ is increased to the input voltage $V_{IN}$ due to the establishment of "$I_H>I_L$," then, it becomes that "$I_H=I_L$" no matter how high the potential of the signal $S_{AMP}$ is. Therefore, the gate voltage $V_G$ does not increase over the input voltage $V_{IN}$. On the other hand, the current driver 31 can lower the gate voltage $V_G$ to the lower limit voltage $V_{LL}$ by continuing an established state that "$I_H<I_L$." When the gate voltage $V_G$ drops to the lower limit voltage $V_{LL}$ due to the establishment of "$I_H<I_L$," then, it becomes that "$I_H=I_L$" no matter how low the potential of the signal $S_{AMP}$ is. Therefore, the gate voltage $V_G$ does not become lower than the lower limit voltage $V_{LL}$ based on the operation of the driver 30 (current driver 31).

In this way, a control range of the gate voltage $V_G$ controlled by the driver 30 (current driver 31) is equal to or larger than the lower limit voltage $V_{LL}$ and equal to or less than the input voltage $V_{IN}$. By setting a lower limit (>0) to the control range of the gate voltage $V_G$, it is possible to improve the responsiveness of the output voltage $V_{OUT}$ to the variation in the input voltage $V_{IN}$, as in the reference configuration.

However, as described above in respect of the reference configuration, when the input voltage $V_{IN}$ drops below the target voltage $V_{TG}$, if the drop in the gate voltage VG is stopped at the lower limit voltage $V_{LL}$, the differential voltage ($V_{IN}-V_{OUT}$) or ($V_{IN}-V_{TG}$) may become too large.

Taking this into consideration, the full-on circuit 40 is provided in the semiconductor device 1 according to the first embodiment. The full-on circuit 40 performs full-on driving of the output transistor M1 in a situation where the input voltage $V_{IN}$ becomes equal to or lower than the target voltage $V_{TG}$ and the output voltage $V_{OUT}$ becomes lower than the target voltage $V_{TG}$ by a predetermined value or more. The full-on driving of the output transistor M1 refers to an operation in which the gate voltage $V_G$ is lowered to substantially 0 V (set to a voltage lower than at least the lower limit voltage $V_{LL}$).

When the output voltage $V_{OUT}$ drops below a predetermined determination voltage $V_{DET}$ lower than the target voltage $V_{TG}$, the full-on circuit 40 lowers the gate voltage $V_G$ to below the lower limit voltage $V_{LL}$ prior to the operation of the driver 30. The determination voltage $V_{DET}$ referred to here is $k_A$ times higher than the output voltage $V_{OUT}$. $k_A$ is the ratio of the reference voltage $V_{REF2}$ to the reference voltage $V_{REF1}$. As described above, "$k_A$=0.97."

Specifically, the full-on circuit 40 includes an active circuit 41 and a transistor 42. The active circuit 41 is an amplifier or a comparator and includes an inverting input terminal, a non-inverting input terminal, and an output terminal. The transistor 42 is an N-channel MOSFET. The inverting input terminal of the active circuit 41 is connected to the connection node between the voltage dividing resistors R1 and R2 to receive the feedback voltage $V_{FB}$. The reference voltage $V_{REF2}$ is inputted to the non-inverting input terminal of the active circuit 41. The output terminal of the active circuit 41 is connected to the gate of the transistor 42. The drain of the transistor 42 is connected to the gate wiring $WR_G$ (therefore, connected to the gate of the output transistor M1), and the source of the transistor 42 is connected to the ground wiring $WR_{GND}$ (therefore, connected to the ground).

The active circuit 41 is driven based on the internal power supply voltage $V_{REG}$ with the ground potential as a reference. The active circuit 41 compares the feedback voltage $V_{FB}$ inputted thereto with the reference voltage $V_{REF2}$, and outputs a signal $S_{41}$ based on the comparison result from its own output terminal. The output signal $S_{41}$ of the active circuit 41 is supplied to the gate of the transistor 42. Therefore, the active circuit 41 controls the gate voltage of the transistor 42, thereby controlling a state (on-state or off-state) of the transistor 42. When the signal $S_{EN}$ has a value of "0," when the signal $S_{TSD}$ has a value of "1," or when a low voltage abnormality is detected, the active circuit 41 stops the operation. When the active circuit 41 stops the operation, the gate voltage of the transistor 42 becomes 0 V, and the transistor 42 is fixed in an off-state.

When the feedback voltage $V_{FB}$ is higher than the reference voltage $V_{REF2}$, the active circuit 41 lowers the voltage of the signal $S_{41}$ to below the gate threshold voltage of the transistor 42 so that the transistor 42 comes into an off-state. When the feedback voltage $V_{FB}$ is lower than the reference voltage $V_{REF2}$, the active circuit 41 increases the potential of the signal $S_{41}$ so that a significant drain current flows through the transistor 42. That is, the active circuit 41 lowers the gate voltage $V_G$ to below the lower limit voltage $V_{LL}$ by generating a current flowing from the gate of the output transistor M1 to the ground through the transistor 42.

A case where the active circuit 41 is a comparator is considered. At this time, the active circuit 41 is called a comparator 41. The comparator 41 turns on or off the transistor 42 as a switch based on the feedback voltage $V_{FB}$ and the reference voltage $V_{REF2}$.

That is, when "$V_{FB}<V_{REF2}$," the comparator 41 turns on the transistor 42 by applying a signal $S_{41}$ of a high level to the gate of the transistor 42. When the transistor 42 is turned on, the gate of the output transistor M1 and the ground are short-circuited through the transistor 42. Due to the short-circuiting, the gate voltage $V_G$ drops to substantially 0 V. The signal $S_{41}$ of a high level has a potential sufficiently higher than a gate threshold voltage of the transistor 42, specifically a potential of the internal power supply voltage $V_{REG}$. When the gate voltage $V_G$ is lower than the lower limit voltage $V_{LL}$, the current driver 31 comes into a state in which currents $I_H$ and $I_L$, which establish "$I_H>I_L$," are generated regardless of the signal $S_{AMP}$. Therefore, when the transistor 42 is controlled to be turned on by the comparator 41, a differential current ($I_H-I_L$) flows through the transistor 42.

Conversely, when "$V_{FB}>V_{REF2}$," the comparator 41 turns off the transistor 42 by applying a signal $S_{41}$ of a low level, which is sufficiently lower than the gate threshold voltage of the transistor 42, to the gate of the transistor 42. When the transistor 42 is turned off, a current flowing through the transistor 42 is not generated between the gate of the output transistor M1 and the ground. The signal $S_{41}$ of a low level has a potential sufficiently lower than the gate threshold voltage of the transistor 42, specifically, a ground potential. When the feedback voltage $V_{FB}$ inputted to the comparator 41 and the reference voltage $V_{REF2}$ are equal to each other, the signal $S_{41}$ becomes a high level or a low level.

After the gate voltage $V_G$ becomes lower than the lower limit voltage $V_{LL}$ due to the current (drain current) flowing through the transistor 42, if the transistor 42 is turned off by the establishment of "$V_{FB}>V_{REF2}$," the current driver 31 generates currents $I_H$ and $I_L$ that establish "$I_H>I_L$." Therefore, the gate voltage $V_G$ rises toward the lower limit voltage $V_{LL}$ based on the differential current ($I_H-I_L$) (this holds true even if the active circuit 41 is an amplifier). Thereafter, based on the signal $S_{AMP}$ at the time when the gate voltage $V_G$ reaches the lower limit voltage $V_{LL}$, the gate voltage $V_G$ increases over the lower limit voltage $V_{LL}$, or the increase in the gate voltage $V_G$ stops at the lower limit voltage $V_{LL}$.

In reality, it is desirable that the comparator 41 has hysteresis characteristics. The comparator 41 having hysteresis characteristics will be referred to as a hysteresis comparator 41. The operation related to the hysteresis comparator 41 will be described below.

If the establishment state of "$V_{FB}>V_{REF2}$" is shifted to the establishment state of "$V_{FB}<V_{REF2}$" starting from the time when the output signal $S_{41}$ of the hysteresis comparator 41 is at a low level (therefore, the time when the transistor 42 is in an off-state), the hysteresis comparator 41 switches the output signal $S_{41}$ from a low level to a high level, thereby switching the transistor 42 from an off-state to an on-state. Thereafter, the hysteresis comparator 41 maintains the output signal $S_{41}$ at a high level until "$V_{FB}\geq V_{REF2}+\Delta HYS$" is established. If "$V_{FB}\geq V_{REF2}+\Delta HYS$" is established, the hysteresis comparator 41 returns the output signal $S_{41}$ to a low level, thereby returning the transistor 42 from the on-state to the off-state. The voltage ($V_{REF2}+\Delta HYS$) is higher than the reference voltage V REF2 and lower than the reference voltage $V_{REF1}$. For example, "$V_{REF2}=V_{REF1}\times 0.97$" and "$V_{REF2}+\Delta HYS=V_{REF1}\times 0.98$."

A case where the active circuit 41 is an amplifier is considered. In this case, the active circuit 41 is referred to as an amplifier 41. The operation of the full-on circuit 40 when the active circuit 41 is an amplifier is basically the same as the operation of the full-on circuit 40 when the active circuit 41 is a comparator.

That is, the amplifier 41 controls the gate voltage of the transistor 42 through the output of the signal $S_{41}$ based on the feedback voltage $V_{FB}$ and the reference voltage $V_{REF2}$. If "$V_{FB}<V_{REF2}$," the amplifier 41 turns on the transistor 42 by raising the potential of the signal $S_{41}$ to become higher than the gate threshold voltage of the transistor 42, thereby causing the transistor 42 to generate a drain current. Since the drain current of the transistor 42 flows from the gate wiring $WR_G$ toward the ground, the gate voltage $V_G$ is decreased by the drain current of the transistor 42. Depending on the magnitude of the drain current of the transistor 42, the gate voltage $V_G$ drops substantially to 0 V. As described above, when the gate voltage $V_G$ is lower than the lower limit voltage $V_{LL}$, the current driver 31 comes into a state in which currents $I_H$ and $I_L$, which establish "$I_H>I_L$," are generated regardless of the signal $S_{AMP}$. Therefore, when the transistor 42 is controlled to be turned on by the amplifier 41, a differential current $(I_H-I_L)$ flows through the transistor 42.

Conversely, when "$V_{FB}>V_{REF2}$," the amplifier 41 lowers the potential of the signal $S_{41}$ to below the gate threshold voltage of the transistor 42, thereby turning off the transistor 42. When the transistor 42 is turned off, a current flowing between the gate of the output transistor M1 and the ground through the transistor 42 is not generated.

Figure 6:
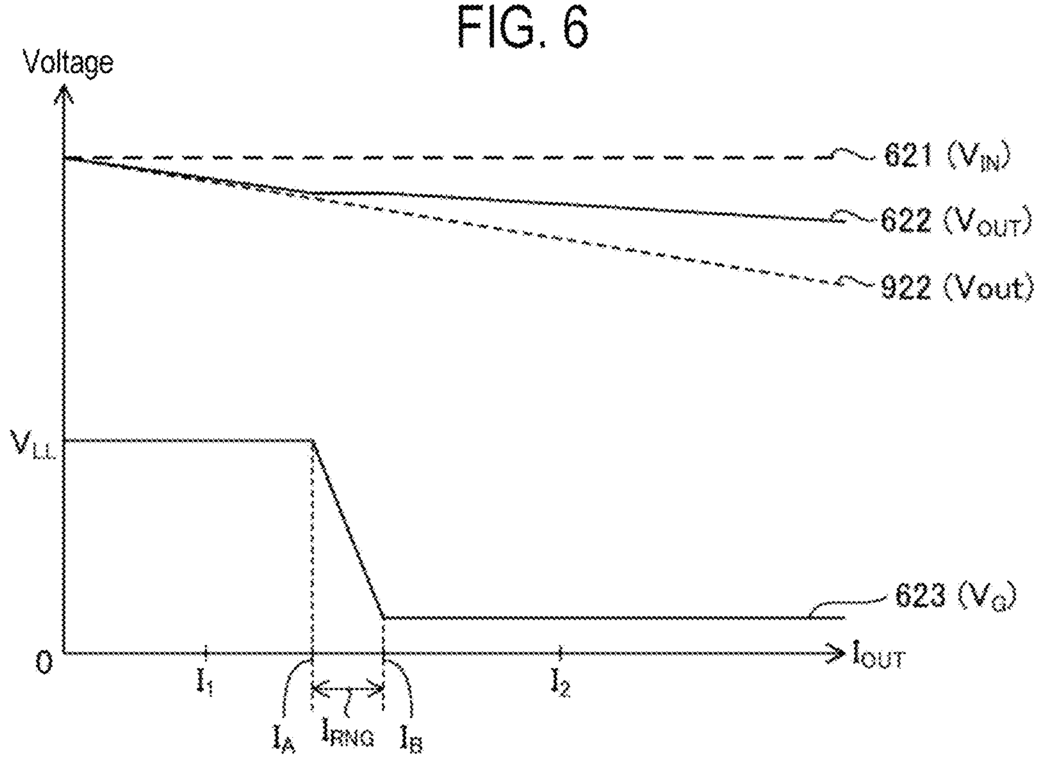
FIG. 6 is an explanatory diagram of output characteristics of the semiconductor device according to the first embodiment of the present disclosure.

When the active circuit 41 is an amplifier, the potential of the signal $S_{41}$ may be feedback-controlled near the gate threshold voltage of the transistor 42. This will be described with reference to FIG. 6. In FIG. 6, a case in which the target voltage $V_{TG}$ is 5.0 V and the input voltage $V_{IN}$ is 4.95 V is assumed. In FIG. 6, a broken line 621 represents a relationship between the input voltage $V_{IN}$ and the output current $I_{OUT}$, a solid line 622 represents a relationship between the output voltage $V_{OUT}$ and the output current $I_{OUT}$, and a solid line 623 represents a relationship between the gate voltage $V_G$ and the output current $I_{OUT}$. The waveform of the broken line 922 shown in FIG. 6 corresponds to the waveform of the solid line 922 shown in FIG. 2.

A behavior when the output current $I_{OUT}$ is increased in the case of FIG. 6 is considered. In this case, if the output current $I_{OUT}$ has a current value $I_1$, "$V_{FB}>V_{REF2}$" is maintained, so that, although, the transistor 42 is in an off-state, the gate voltage $V_G$ is lowered to the lower limit voltage $V_{LL}$ by the driver 30.

In the case of FIG. 6, when the output current $I_{OUT}$ has a current value $I_2$ which is sufficiently larger than the current value $I_1$, it becomes that "$V_{FB}<V_{REF2}$." The amplifier 41 increases the potential of the signal $S_{41}$ to the potential of the internal power supply voltage $V_{REG}$, so that the transistor 42 is in an on-state. Therefore, the gate of the output transistor M1 and the ground are short-circuited by the transistor 42, and the gate voltage $V_G$ is decreased to 0 V.

In FIG. 6, the current range $I_{RNG}$ is a range from a current value $I_A$ larger than the current value $I_1$ to a current value $I_B$ smaller than the current value $I_2$ $(I_A>I_B)$. In the case of FIG. 6, as the value of the output current $I_{OUT}$ increases from the current value $I_1$, the output voltage $V_{OUT}$ and the feedback voltage $V_{FB}$ decrease. When the value of the output current $I_{OUT}$ reaches the current value $I_A$, the feedback voltage $V_{FB}$ drops to the reference voltage $V_{REF2}$. Even when the value of the output current $I_{OUT}$ falls within the current range $I_{RNG}$, the increase in the output current $I_{OUT}$ acts in such a direction as to lower the output voltage $V_{OUT}$. In order to cancel the decrease in the output voltage $V_{OUT}$, the full-on circuit 40 including the amplifier 41 reduces the gate voltage $V_G$ as the output current $I_{OUT}$ increases (the full-on circuit 40 reduces the gate voltage $V_G$ through the increase in the potential of the signal $S_{41}$). Therefore, when the value of the output current $I_{OUT}$ falls within the current range $I_{RNG}$, the feedback voltage $V_{FB}$ approximately matches the reference voltage $V_{REF2}$.

When the value of the output current $I_{OUT}$ increases to the current value $I_B$, the gate voltage $V_G$ drops to 0 V. After the value of the output current $I_{OUT}$ exceeds the current value $I_B$, the full-on circuit 40 including the amplifier 41 maintains the gate voltage $V_G$ at 0 V.

In FIG. 6, as can be seen from the comparison of the solid line 622 according to the first embodiment with the broken line 922 according to the reference configuration, it can be noted that in the first embodiment, the differential voltages $(V_{IN}-V_{OUT})$ and $(V_{IN}-V_{TG})$ when "$V_{IN}\leq V_{TG}$" can be suppressed more than the reference configuration by the full-on driving using the full-on circuit 40. The solid line 622 represents the characteristics when an amplifier is used as the active circuit 41. Even when a comparator is used as the active circuit 41, the differential voltage can be similarly suppressed more than the reference configuration.

In addition, the full-on circuit 40 monitors the feedback voltage $V_{FB}$ corresponding to the output voltage $V_{OUT}$, and does not operate at all before "$V_{IN}\leq V_{TG}$" due to the drop in the input voltage $V_{IN}$. Therefore, the full-on circuit 40 does not affect the normal regulation operation.

For example, when configuring an LDO which can output an output current $I_{OUT}$ of 1 A (ampere) as a specification, if full-on driving is not used, it is necessary to use an output transistor M1 having a relatively large size so that the output current $I_{OUT}$ of 1 A can be outputted even without full-on driving. On the other hand, by making the full-on driving available as in the present embodiment, an output current $I_{OUT}$ of 1 A can be outputted even if an output transistor M1 having a relatively small size is used. In other words, according to the present embodiment, it is possible to reduce the size of the output transistor (901 or M1) as compared to the reference configuration. The reduction in the size of the output transistor brings about a reduction in the gate capacitance of the output transistor. Therefore, it is expected to improve the responsiveness.

Further, the reference voltage $V_{REF2}$ referenced by the full-on circuit 40 is generated based on the reference voltage $V_{REF1}$ used for the original regulation operation. Therefore, when the reference voltage $V_{REF1}$ deviates from the design value, the reference voltage $V_{REF2}$ also deviates from the design value in conjunction therewith, and "$V_{REF2}=V_{REF1}\times k_A$" is maintained. Therefore, even if the reference voltage $V_{REF1}$ varies, the full-on circuit 40 can operate as expected.

The circuit current of the driver 30 becomes large in a state in which "$V_{IN}\leq V_{TG}$" is established as compared to a state in which the input voltage $V_{IN}$ is sufficiently higher than the target voltage $V_{TG}$. For this reason, for example, a configuration for detecting an increase in the circuit current of the driver 30 may be provided in the semiconductor device 1. When an increase in the circuit current of the driver 30 is detected (when the circuit current of the driver 30 is equal to or larger than a predetermined value), the circuit current (bias current) of the active circuit 41 may be increased as compared to a case where such is not the case. By increasing the circuit current of the active circuit 41, it is possible to improve the response speed of the active circuit 41 and to stabilize the frequency characteristics.

When the active circuit 41 does not need to operate, the circuit current of the active circuit 41 is kept low, thereby suppressing unnecessary power consumption.

Second Embodiment

Figure 7:
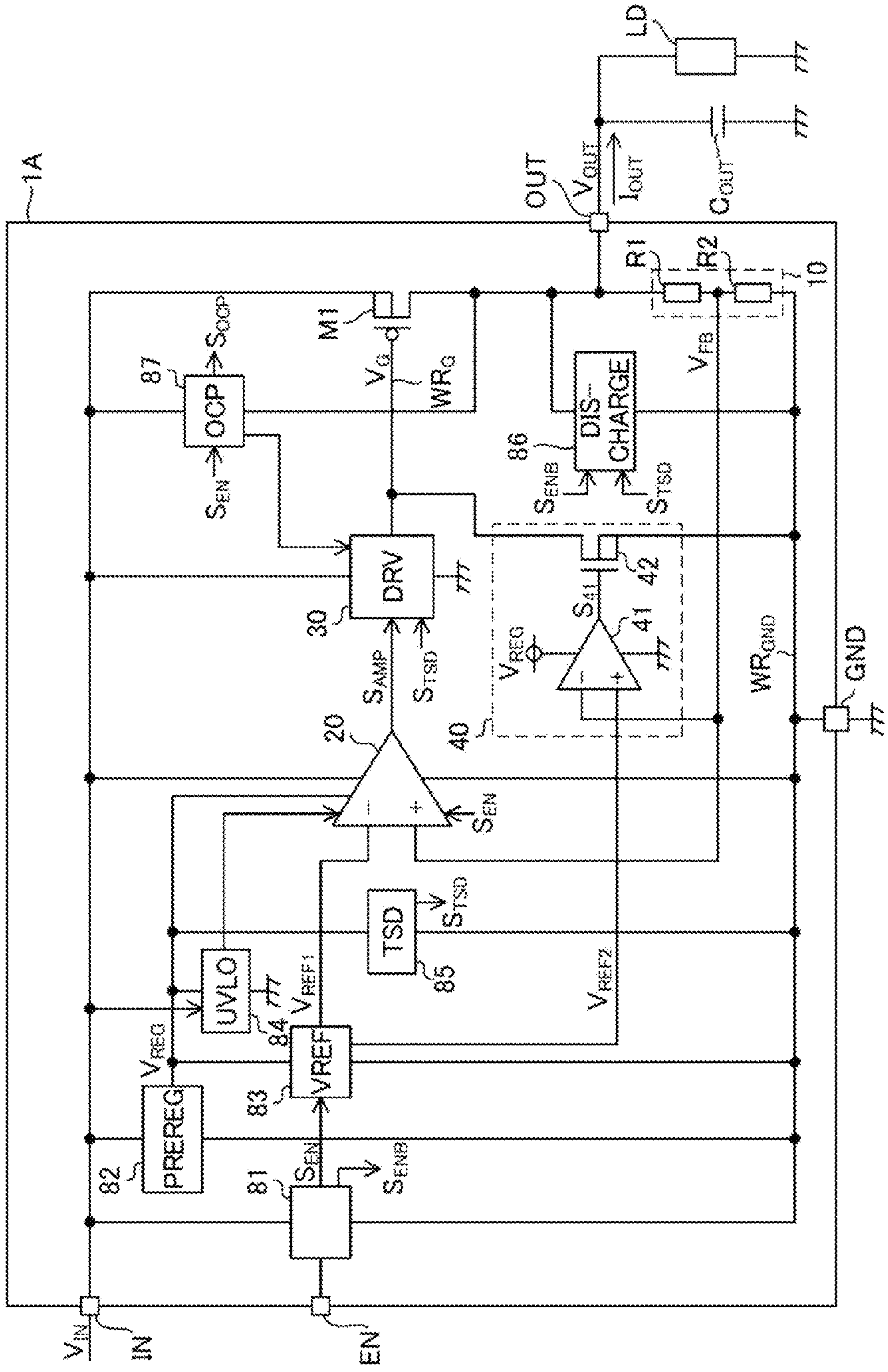
FIG. 7 is a configuration diagram of a semiconductor device (linear regulator) according to a second embodiment of the present disclosure.

A second embodiment of the present disclosure will be described. FIG. 7 shows a configuration of a semiconductor device 1A according to a second embodiment. The semiconductor device 1A has a configuration in which an overcurrent protection circuit 87 is added to the semiconductor device 1 according to the first embodiment. In other respects (except the description regarding the full-on circuit 40 to be described later), the configuration and operation of the semiconductor device 1A are similar to the configuration and operation of the semiconductor device 1 described in the first embodiment. Unless there is a contradiction, the description of the first embodiment also applies to the second embodiment. In this case, the description "semiconductor device 1" in the first embodiment may be read as "semiconductor device 1A" in the second embodiment.

The overcurrent protection circuit 87 operates meaningfully only when a signal $S_{EN}$ is inputted to the overcurrent protection circuit 87 and the signal $S_{EN}$ has a value of "1." The overcurrent protection circuit 87 is connected to the wiring to which the input voltage $V_{IN}$ is applied (i.e., the source of the output transistor M1) and the wiring to which the output voltage $V_{OUT}$ is applied (i.e., the drain of the output transistor M1), and is configured to detect whether or not the output transistor M1 is in an overcurrent state.

When it is detected that the output transistor M1 is in an overcurrent state, the overcurrent protection circuit 87 outputs a signal $S_{OCP}$ having a value of "1" and performs an overcurrent protection operation. An initial value of the signal $S_{OCP}$ is "0." When the signal $S_{OCP}$ has a value of "0," the overcurrent protection operation is not executed. The signal $S_{OCP}$ of "1" indicates that the output transistor M1 is in an overcurrent state, and the signal $S_{OCP}$ of "0" does not indicate that the output transistor M1 is in an overcurrent state. After starting the overcurrent protection operation, when it is detected that the overcurrent state is resolved, the overcurrent protection circuit 87 stops the overcurrent protection operation and changes the value of the signal $S_{OCP}$ from "1" to "."

Figure 8:
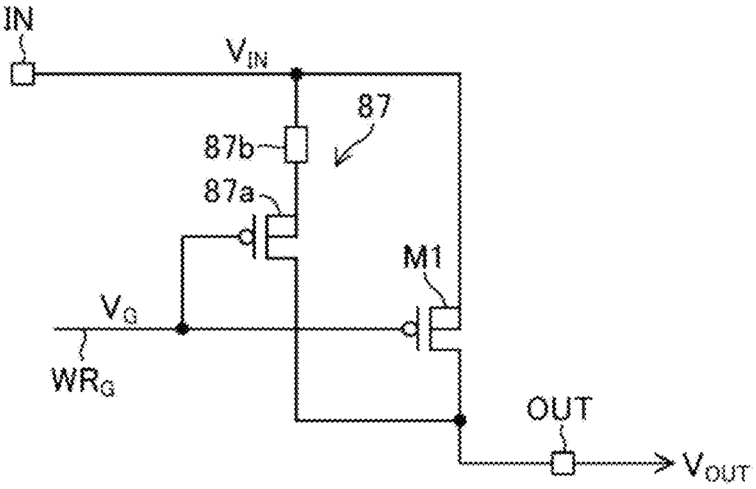
FIG. 8 is a configuration diagram of a main part of an overcurrent protection circuit according to the second embodiment of the present disclosure.

FIG. 8 shows a configuration example of a main part of the overcurrent protection circuit 87. The overcurrent protection circuit 87 includes a transistor 87*a* and a shunt resistor 87*b*. The transistor 87*a* is a P-channel MOSFET. A source of the transistor 87*a* is connected to the input terminal IN via the shunt resistor 87*b* (and therefore connected to the source of the output transistor M1). Drains of the transistor 87*a* and the output transistor M1 are commonly connected to the output terminal OUT, and gates of the transistor 87*a* and the output transistor M1 are commonly connected to the gate wiring $WR_G$. Although a size of the transistor 87*a* is much smaller than a size of the output transistor M1, the transistor 87*a* and the output transistor M1 have similar structures formed by the same manufacturing process. Therefore, a current proportional to the drain current of the output transistor M1 flows as a drain current of the transistor 87*a*, and the drain current of the transistor 87*a* flows through the shunt resistor 87*b*. Accordingly, the overcurrent protection circuit 87 can detect a value of the output current $I_{OUT}$ corresponding to the drain current of the output transistor M1 based on the voltage across the shunt resistor 87*b*.

Figure 9:
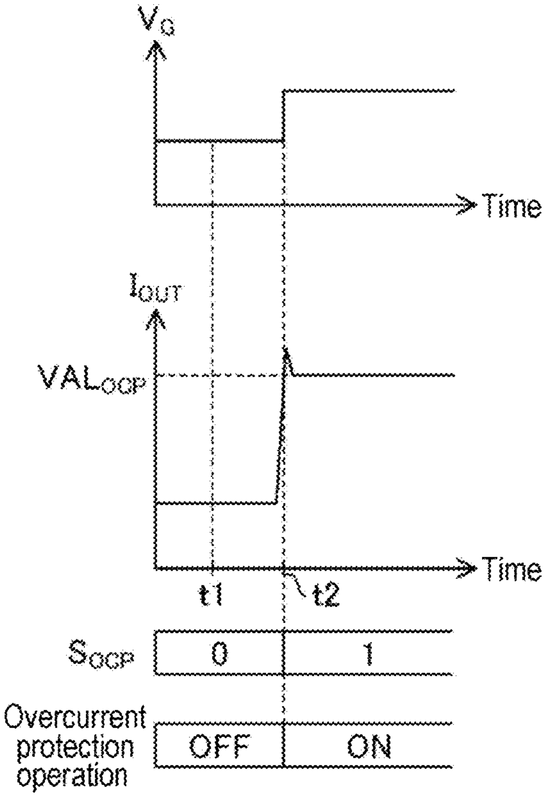
FIG. 9 is an explanatory diagram of an overcurrent protection operation according to the second embodiment of the present disclosure.

The overcurrent protection circuit 87 determines that the output transistor M1 is in an overcurrent state when the value of the output current $I_{OUT}$ exceeds a predetermined overcurrent determination value $VAL_{OCP}$. Reference is made to FIG. 9. The operation of the overcurrent protection circuit 87 will be described starting from time t1 when the value of the output current $I_{OUT}$ is sufficiently lower than the overcurrent determination value $VAL_{OCP}$ and the signal $S_{OCP}$ has a value of "0." When the signal $S_{OCP}$ has a value of "0," the overcurrent protection circuit 87 has no effect on the operation of the driver 30.

After time t1, a factor which increases the output current $I_{OUT}$ is generated to thereby increase the output current $I_{OUT}$, and at time t2, the value of the output current $I_{OUT}$ exceeds the overcurrent determination value $I_{OCP}$. When it is detected at time t2 that the value of the output current $I_{OUT}$ exceeds the overcurrent determination value $I_{OCP}$ based on the voltage across the shunt resistor 87*b*, the overcurrent protection circuit 87 changes the value of the signal $S_{OCP}$ from "0" to "1" and starts an overcurrent protection operation.

In the overcurrent protection operation, the overcurrent protection circuit 87 controls the driver 30 so that the value of the output current $I_{OUT}$ is limited to the overcurrent determination value $I_{OCP}$ or less by referencing the voltage between both ends of the shunt resistor 87*b*.

During the execution period of the overcurrent protection operation, the control of the driver 30 by the overcurrent protection circuit 87 is given priority over the signal $S_{AMP}$. Therefore, during the execution period of the overcurrent protection operation, under the control of the overcurrent protection circuit 87, the driver 30 controls the gate voltage $V_G$ so that the value of the output current $I_{OUT}$ is limited to the overcurrent determination value $I_{OCP}$ or less even if "$V_{FB}<V_{REF1}$." Compared to the gate voltage VG immediately before time t2, the gate voltage $V_G$ increases during the execution period of the overcurrent protection operation, thereby limiting the value of the output current $I_{OUT}$ to the overcurrent determination value $I_{OCP}$ or less. Thereafter, although not particularly shown in the figure, when the increase factor of the output current $I_{OUT}$ is resolved and the value of the output current $I_{OUT}$ falls below the resolution determination value that is smaller than the overcurrent determination value $I_{OCP}$, the overcurrent protection circuit 87 stops the overcurrent protection operation and changes the value of the signal $S_{OCP}$ from "1" to "0."

In this way, the overcurrent protection operation performed when the overcurrent state of the output transistor M1 is detected acts to increase the gate voltage $V_G$. On the other hand, during the execution period of the overcurrent protection operation, the value of the output current $I_{OUT}$ is limited to the overcurrent determination value $I_{OCP}$ or less even if "$V_{FB}<V_{REF1}$." Therefore, during the execution period of the overcurrent protection operation, the output current $I_{OUT}$ required to maintain the output voltage $V_{OUT}$ at the target voltage $V_{TG}$ may not be outputted, and the output voltage $V_{OUT}$ may fall significantly below the target voltage $V_{TG}$.

Figure 10:
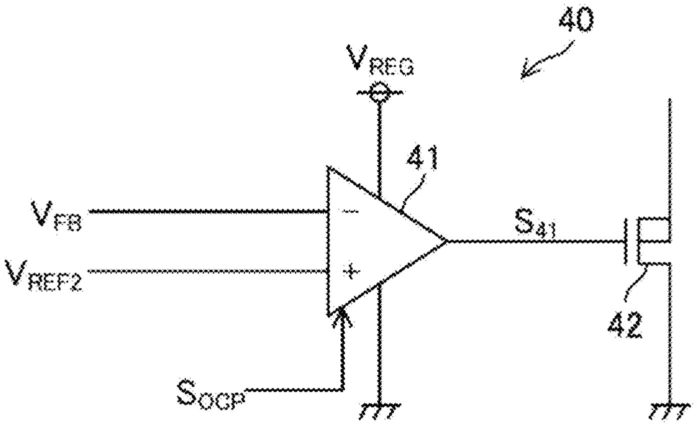
FIG. 10 is a configuration diagram of a full-on circuit according to the second embodiment of the present disclosure.

If the full-on circuit 40 were to operate based on such a decrease in the output voltage $V_{OUT}$, the operation of the full-on circuit 40 would compete with the overcurrent protection operation. Therefore, in the semiconductor device 1A, as shown in FIG. 10, whether or not to execute the operation of the active circuit 41 is controlled based on the signal $S_{OCP}$. That is, when the signal $S_{OCP}$ has a value of "1," the operation of the active circuit 41 is stopped. As described in the first embodiment, when the active circuit 41 stops operating, the gate voltage of the transistor 42 becomes 0 V, and the transistor 42 is fixed in an off-state. That is, when the signal $S_{OCP}$ has a value of "1," the full-on circuit 40 stops (does not execute) the operation that causes the gate voltage $V_G$ to decrease, regardless of the output voltage $V_{OUT}$ (i.e., regardless of a level relationship between the feedback voltage $V_{FB}$ and the reference voltage $V_{REF2}$).

The active circuit 41 can operate when the signal $S_{OCP}$ has a value of "0." More specifically, when the signal $S_{EN}$ has a value of "1," the signals $S_{OCP}$ and $S_{TSD}$ have a value of "0," and no low voltage abnormality is detected, the active circuit 41 operates. As in the first embodiment, the active circuit 41 controls the gate voltage of the transistor 42 based on the result of comparison between the reference voltage $V_{REF2}$ and the feedback voltage $V_{FB}$.

The embodiments of the present disclosure may be appropriately modified in various ways within the scope of the technical idea defined in the claims. The above-described embodiments are merely examples of the embodiments of the present disclosure, and the meanings of the terms of respective components in the present disclosure are not limited to those described in the above embodiments. The specific numerical values shown in the above-mentioned explanatory text are merely examples, and it goes without saying that they may be changed to various numerical values.

The types of channels of the FETs (field effect transistors) shown in each embodiment are merely examples. Without detracting from the above-mentioned purpose, the channel type of any FET may be changed between a P-channel and an N-channel.

Any of the transistors mentioned above may be any type of transistor as long as no problem occurs. For example, any transistors mentioned above as MOSFETs may be replaced with junction FETs, IGBTs (Insulated Gate Bipolar Transistors), or bipolar transistors, unless a problem occurs. Any transistor includes a first electrode, a second electrode, and a control electrode. In a FET, one of the first and second electrodes is a drain, the other is a source, and the control electrode is a gate. In an IGBT, one of the first and second electrodes is a collector, the other is an emitter, and the control electrode is a gate. In a bipolar transistor that does not belong to an IGBT, one of the first and second electrodes is a collector, the other is an emitter, and the control electrode is a base.

Supplementary Note

Supplementary notes will be provided regarding the present disclosure, in which specific configuration examples are shown in the above-described embodiments.

A linear regulator (1 or 1A) according to one aspect of the present disclosure includes: an input terminal (IN) configured to receive an input voltage ($V_{IN}$); an output terminal (OUT) configured to be applied with an output voltage ($V_{OUT}$); an output transistor (M1) connected between the input terminal and the output terminal, and constituted by a P-channel MOSFET; a gate control circuit (20 or 30) configured to control a gate voltage ($V_G$) of the output transistor to stabilize the output voltage at a target voltage ($V_{TG}$) based on a feedback voltage ($V_{FB}$) corresponding to the output voltage; and an additional circuit (40), wherein a control range of the gate voltage controlled by the gate control circuit is equal to or higher than a predetermined lower limit voltage ($V_{LL}$), and wherein the additional circuit is configured to lower the gate voltage to below the lower limit voltage when the output voltage falls below a determination voltage lower than the target voltage (first configuration).

This makes it possible to reduce the difference between the output voltage and the target voltage that may occur when the input voltage drops.

In the linear regulator of the first configuration, the gate control circuit controls the gate voltage based on a comparison result of the feedback voltage and a predetermined first reference voltage ($V_{REF1}$), wherein the additional circuit compares the feedback voltage with a predetermined second reference voltage ($V_{REF2}$) lower than the first reference voltage and lowers the gate voltage to below the lower limit voltage when the feedback voltage is lower than the second reference voltage (second configuration).

In the linear regulator of the second configuration, the additional circuit includes an additional transistor (42) provided between a gate of the output transistor and a ground, and an active circuit (41) configured to control a state of the additional transistor based on the feedback voltage and the second reference voltage, wherein the active circuit controls the additional transistor to be in an off-state when the feedback voltage is higher than the second reference voltage, and lowers the gate voltage to below the lower limit voltage by generating a current flowing from the gate of the output transistor to the ground through the additional transistor when the feedback voltage is lower than the second reference voltage (third configuration).

In the linear regulator of the third configuration, the active circuit is a comparator or an amplifier, and is configured to control a state of the additional transistor by controlling a voltage of a control electrode of the additional transistor based on the feedback voltage and the second reference voltage (fourth configuration).

The linear regulator of the fourth configuration further includes: a voltage generation circuit (82 or 83) configured to generate the first reference voltage based on the input voltage and generate the second reference voltage based on the first reference voltage (fifth configuration).

This makes it possible to suppress the influence of variation in the first reference voltage.

The linear regulator of the fifth configuration further includes: an overcurrent protection circuit (87) configured to detect that the value of the output current flowing through the output transistor exceeds a predetermined overcurrent determination value, wherein when the overcurrent protection circuit detects that the value of the output current exceeds the overcurrent determination value, the gate control circuit controls the gate voltage so as to limit the value of the output current to the overcurrent determination value or less, and the additional circuit stops an operation that causes a decrease in the gate voltage regardless of the output voltage (sixth configuration).

This makes it possible to avoid conflict between the overcurrent protection operation and the operation of the additional circuit.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A linear regulator, comprising:

an input terminal configured to receive an input voltage;

an output terminal configured to be applied with an output voltage;

an output transistor connected between the input terminal and the output terminal, and constituted by a P-channel MOSFET;

a gate control circuit configured to control a gate voltage of the output transistor to stabilize the output voltage at a target voltage based on a feedback voltage corresponding to the output voltage;

an additional circuit; and an overcurrent protection circuit configured to detect that a value of an output current flowing through the output transistor exceeds a predetermined overcurrent determination value, wherein a control range of the gate voltage controlled by the gate control circuit is equal to or higher than a predetermined lower limit voltage, wherein the additional circuit is configured to lower the gate voltage to below the lower limit voltage when the output voltage falls below a determination voltage lower than the target voltage, and wherein when the overcurrent protection circuit detects that the value of the output current exceeds the overcurrent determination value, the gate control circuit controls the gate voltage so as to limit the value of the output current to the overcurrent determination value or less, and the additional circuit stops an operation which causes a decrease in the gate voltage regardless of the output voltage.

2. The linear regulator of claim 1, wherein the gate control circuit controls the gate voltage based on a comparison result of the feedback voltage and a predetermined first reference voltage, and wherein the additional circuit compares the feedback voltage with a predetermined second reference voltage lower than the first reference voltage and lowers the gate voltage to below the lower limit voltage when the feedback voltage is lower than the second reference voltage.

3. The linear regulator of claim 2, wherein the additional circuit includes an additional transistor provided between a gate of the output transistor and a ground, and an active circuit configured to control a state of the additional transistor based on the feedback voltage and the second reference voltage, and wherein the active circuit controls the additional transistor to be in an off-state when the feedback voltage is higher than the second reference voltage, and lowers the gate voltage to below the lower limit voltage by generating a current flowing from the gate of the output transistor to the ground through the additional transistor when the feedback voltage is lower than the second reference voltage.

4. The linear regulator of claim 3, wherein the active circuit is a comparator or an amplifier, and is configured to control the state of the additional transistor by controlling a voltage of a control electrode of the additional transistor based on the feedback voltage and the second reference voltage.

5. The linear regulator of claim 2, further comprising:

a voltage generation circuit configured to generate the first reference voltage based on the input voltage and generate the second reference voltage based on the first reference voltage.

* * * * *